US012750543B2

(12) United States Patent
Park et al.

(10) Patent No.: US 12,750,543 B2
(45) Date of Patent: Sep. 29, 2026

(54) TELEVISION AND SYSTEM CONTROL METHOD

(71) Applicant: LG ELECTRONICS INC., Seoul (KR)

(72) Inventors: Jonghwan Park, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/871,053

(22) PCT Filed: Jun. 2, 2022

(86) PCT No.: PCT/KR2022/007840
§ 371 (c)(1),
(2) Date: Dec. 2, 2024

(87) PCT Pub. No.: WO2023/234440
PCT Pub. Date: Dec. 7, 2023

(65) Prior Publication Data
US 2025/0373875 A1 Dec. 4, 2025

(51) Int. Cl.

| | |
|---|---|
| ***H04N 21/262*** | (2011.01) |
| ***H04N 21/2187*** | (2011.01) |
| ***H04N 21/414*** | (2011.01) |
| ***H04N 21/422*** | (2011.01) |
| ***H04N 21/472*** | (2011.01) |

(Continued)

(52) U.S. Cl.
CPC ... *H04N 21/26241* (2013.01); *H04N 21/2187* (2013.01); *H04N 21/41407* (2013.01); *H04N 21/42221* (2013.01); *H04N 21/472* (2013.01); *H04N 21/64322* (2013.01); *H04N 21/658* (2013.01); *H04N 21/8586* (2013.01)

(58) Field of Classification Search
None
See application file for complete search history.

(56) References Cited

U.S. PATENT DOCUMENTS

2005/0251821 A1 * 11/2005 Pina ........................ H04N 21/84 725/39
2012/0210343 A1 8/2012 McCoy et al.
(Continued)

FOREIGN PATENT DOCUMENTS

| | | |
|---|---|---|
| EP | 2501144 | 9/2012 |
| KR | 10-2012-0058062 | 6/2012 |

(Continued)

OTHER PUBLICATIONS

European Patent Office Application Serial No. 22944978.0, Search Report dated Apr. 15, 2025, 11 pages.
(Continued)

*Primary Examiner* — Samira Monshi
(74) *Attorney, Agent, or Firm* — LEE, HONG, DEGERMAN, KANG & WAIMEY

(57) ABSTRACT

A television controlled by a remote control, according to one embodiment of the present invention, comprises: an IR receiver for receiving a power-on signal from a remote control; a transceiver for wirelessly communicating with a server, a display for outputting random video data; and a controller for controlling the IR receiver, the transceiver and the display.

12 Claims, 14 Drawing Sheets

(51) Int. Cl.

| | |
|---|---|
| ***H04N 21/643*** | (2011.01) |
| ***H04N 21/658*** | (2011.01) |
| ***H04N 21/858*** | (2011.01) |

(56) References Cited

U.S. PATENT DOCUMENTS

| | | | | |
|---|---|---|---|---|
| 2014/0344848 | A1* | 11/2014 | Busse .................. | H04N 21/462<br>725/28 |
| 2015/0193433 | A1 | 7/2015 | Dykeman et al. | |
| 2025/0182163 | A1* | 6/2025 | Publicover ............ | H04L 67/306 |

FOREIGN PATENT DOCUMENTS

| | | |
|---|---|---|
| KR | 10-2014-0026727 | 3/2014 |
| KR | 101513944 | 4/2015 |
| KR | 101667603 | 10/2016 |
| KR | 1020200010926 | 1/2020 |
| KR | 102232779 | 3/2021 |
| KR | 102332146 | 12/2021 |

OTHER PUBLICATIONS

PCT International Application No. PCT/KR2022/007840, International Search Report dated Feb. 28, 2023, 8 pages.

Korean Intellectual Property Office Application No. 10-2024-7041088, Office Action dated May 21, 2026 8 pages.

* cited by examiner (a) (b)

TELEVISION AND SYSTEM CONTROL METHOD

CROSS-REFERENCE TO RELATED APPLICATION(S)

This application is the National Stage filing under 35 U.S.C. 371 of International Application No. PCT/KR2022/007840, filed on Jun. 2, 2022, the contents of which are all incorporated by reference herein in its entirety.

TECHNICAL FIELD

The present disclosure relates to various multimedia devices (e.g., television (TV), mobile phone, tablet personal computer (PC), laptop, wearable device, or the like). For example, the present disclosure is applicable to a content-linked service between a TV and a mobile device.

BACKGROUND

Conventional channel services are limited to a TV. In other words, there is no service of providing content continuously on another device.

For example, a channel service on a TV (from the perspective of a TV manufacturer) and an over the top (OTT) service on a mobile device (from the perspective of an OTT service provider) are provided and operated independently of each other.

Accordingly, there is a problem in that a history of using (consuming) TV channel services is not cached in a specific server and used as big data.

DISCLOSURE

Technical Problem

An embodiment of the present disclosure is to provide a technique of transmitting information about a channel/content consumed on a TV to a backend server and a database, and upon execution of an OTT application or the like on a mobile device, continuously displaying the channel/content consumed on the TV on the mobile device.

Another embodiment of the present disclosure is to provide a technique of mapping a TV and an OTT service (e.g., installed on a mobile phone) to a unique value, and when a user uses a corresponding channel on the TV or the mobile device for a predetermined time, enabling or recommending the user to continue watching the channel on the other device.

Another embodiment of the present disclosure is to provide a technique of caching and managing channel information or the like used on a device in a server.

Technical Solution

According to an embodiment of the present disclosure, a control method of a system includes transmitting account information identifying at least one user using a first device to a server by the first device, displaying a live broadcast program received through an Internet protocol (IP) network by the first device, transmitting identification information about the live broadcast program to the server by the first device, mapping and storing the account information and the identification information by the server, transmitting account information identical to the account information to the server by a second device, and selectively displaying the live broadcast program or content corresponding to the live broadcast program by the second device according to a current time and an end time of the live broadcast program.

Further, when the current time is earlier than the end time of the live broadcast program, the second device may display the live broadcast program. Further, the identification information about the live broadcast program may be designed to be transmitted to the second device by the server.

For example, when the end time of the live broadcast program is earlier than the current time, the second device may display the content corresponding to the live broadcast program.

For example, before the content corresponding to the live broadcast program is displayed, a first option for selecting a specific content provider (CP) from among at least one CP providing the content may be displayed by the second device, and a second option for selecting an image definition or a price of the content may be displayed by the second device.

The identification information about the live broadcast program may include at least one of a unique ID, channel information, a service name, a media universal resource locator (URL), or a media presentation description (MPD) URL.

Further, only when the live broadcast program received through the IP network is displayed by the first device for a predetermined time or longer, transmitting the identification information about the live broadcast program to the server by the first device may be performed.

When the first device corresponds to a television (TV), the second device may correspond to a mobile device. On the contrary, when the first device corresponds to a mobile device, the second device may correspond to a TV.

For example, a digital video broadcasting-Internet (DVB-I) standard may be applied to the TV.

According to an embodiment of the present disclosure, a TV controlled by a remote control includes an infrared (IR) receiver receiving a power-on signal from the remote control, a transceiver performing wireless communication with a server, a display outputting any video data, and a controller controlling the IR receiver, the transceiver, and the display.

The controller controls the display to selectively display a live broadcast program or content corresponding to the live broadcast program, for example, according to data received from the server and a current time.

Advantageous Effects

According to an embodiment of the present disclosure, since a TV is linkable to an OTT service (e.g., through a portable phone), a channel may be advantageously watched continuously on the TV and the portable phone.

According to another embodiment of the present disclosure, since history information used in a TV and an OTT service is managed in a server, the history information may be used as big data as well as for a channel service, and also used for a personalized service (e.g., service recommendation, customized advertisement, and so on), as high value-added big data.

According to another embodiment of the present disclosure, there is a technical effect that once a TV and a mobile device are connected to a communication network, they may receive a service. Further, the problem that continuous view between a TV and a portable phone is possible only within a short distance based on conventional mirroring or WiFi direct may be overcome.

The effects obtainable from the present disclosure are not limited to the effects described above, and other effects not described may be clearly understood by those skilled in the art to which the present disclosure belongs from the description below.

BRIEF DESCRIPTION OF THE DRAWINGS

FIG. 12 illustrates a process of communicating with a server, while a TV is turned on.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
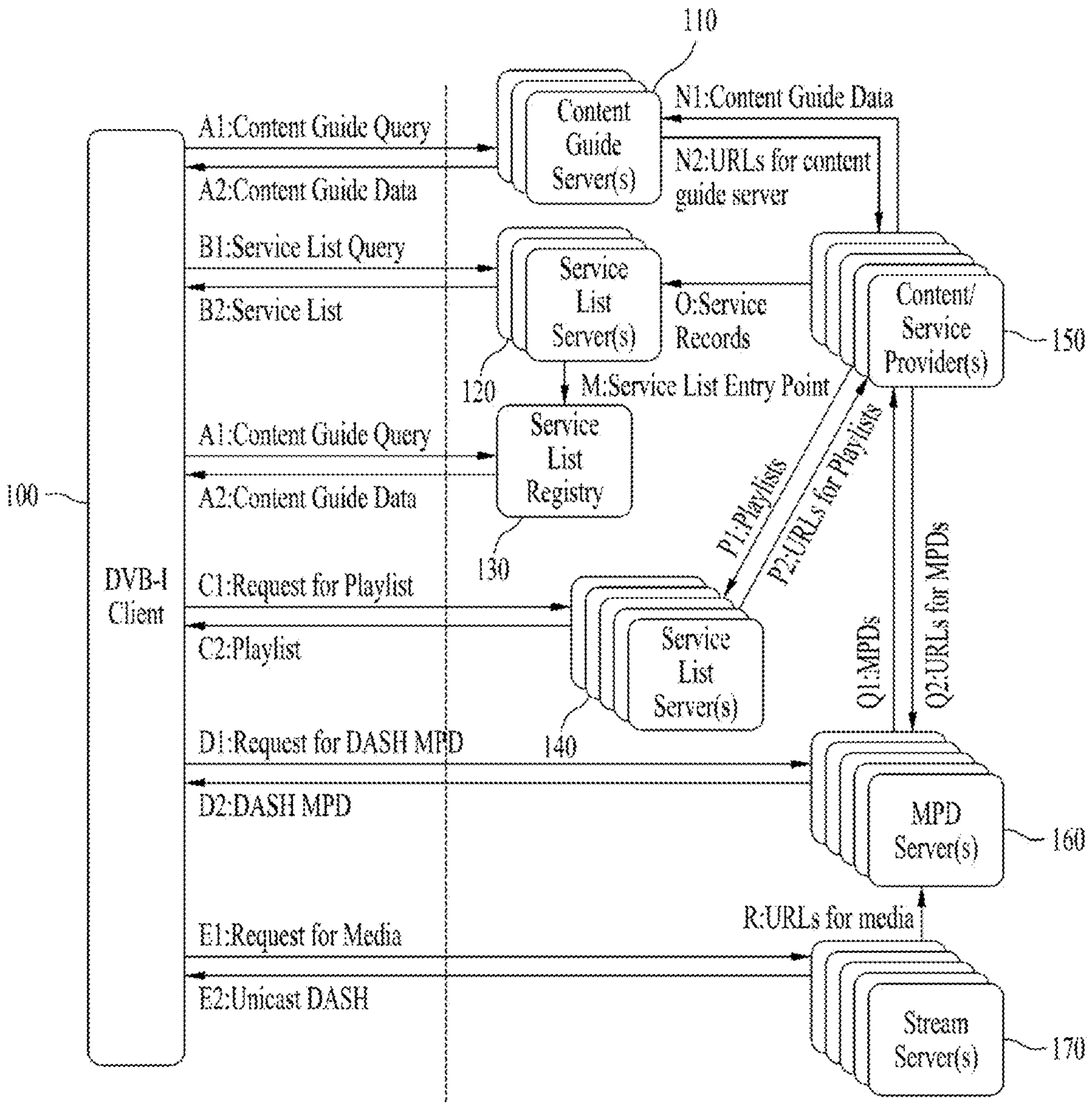
FIG. 1 illustrates a data transmission protocol between a TV and a server according to an embodiment of the present disclosure.

FIG. 1 illustrates a data transmission protocol between a TV and a server according to an embodiment of the present disclosure.

A TV according to an embodiment of the present disclosure may access a live TV service (a broadcast program or the like) transmitted through a broadband network (e.g., an IP network) rather than transmitted based on a radio frequency (RF). Therefore, a tuner for receiving an RF signal is not necessarily required. Further, the TV according to an embodiment of the present disclosure is also applicable to, for example, a digital video broadcasting-Internet (DVB-I) standard. With reference to FIG. 1, a DVB-I client 100, which is an example of a TV communicating with various servers, will be described.

As illustrated in FIG. 1, a service list registry 130 communicates with the DVB-I client 100 based on query parameters and so on. The DVB-I client corresponds to, for example, a TV capable of receiving a live broadcast program through an IP network, and specific components inside the TV will be described in more detail later with reference to FIG. 2.

A service list server 120 transmits a service list to the DVB-I client 100.

A content guide server 110 responds to a request for content guide data received from the DVB-I client 100.

A content/service provider 150 refers to an organization that provides DVB-I services.

A playlist server 140 provides a list of services that reference a playlist of DVB-DASH content items.

A media presentation description (MPD) server 160 provides a dynamic adaptive streaming over hypertext transfer protocol (HTTP) (DASH) MPD, and a stream server 170 transmits a DASH media segment to the DVB-I client 100.

A HTTP GET request is used for the processes of C1 (Request for playlist), DI (Request for DASH MPD), and E1 (Request for media) illustrated in FIG. 1, and a HTTP process between a TV (e.g., the DVB-I client 100) and a server will be described below in more detail with reference to FIG. 3.

Figure 2:
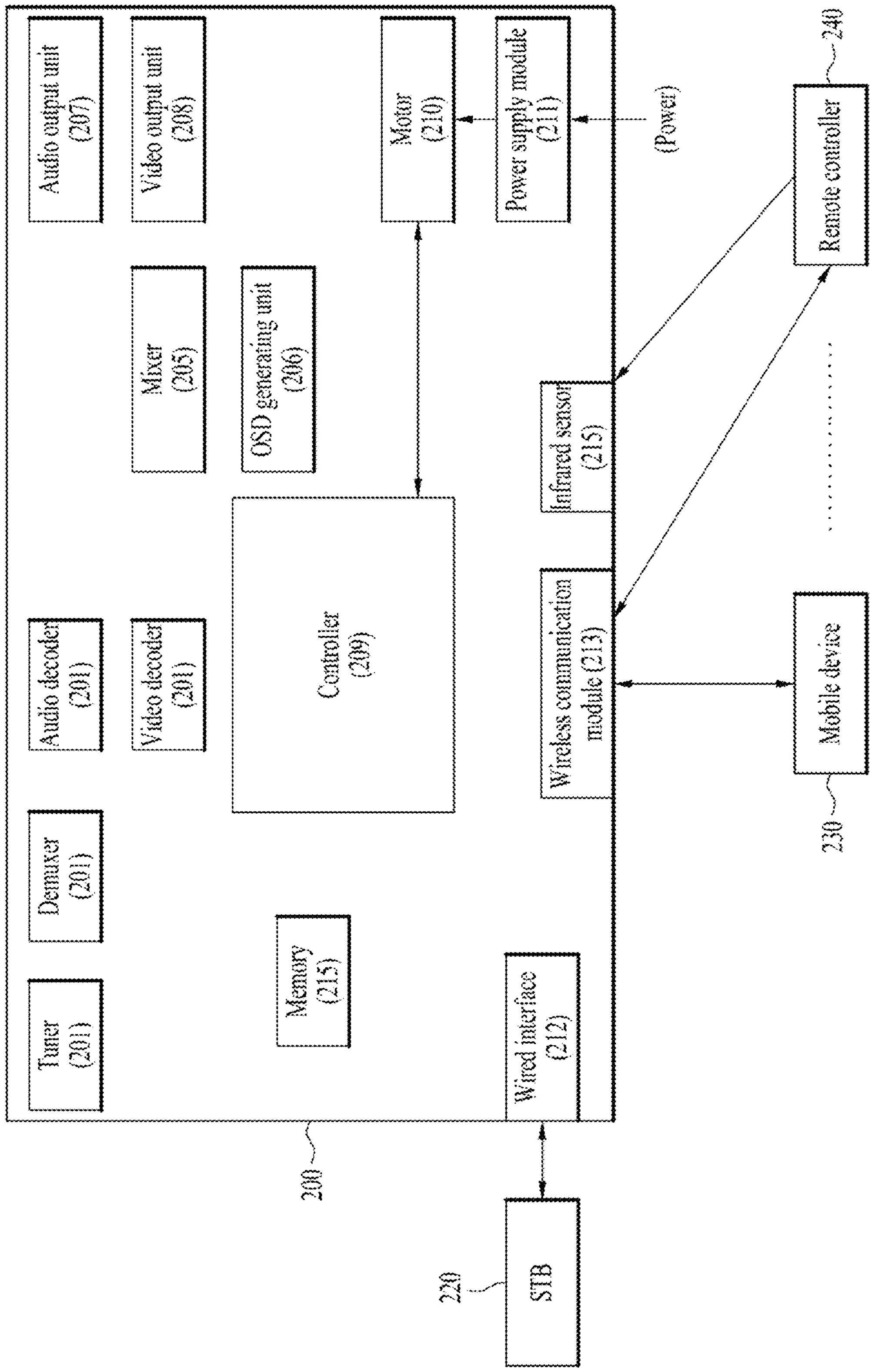
FIG. 2 illustrates components inside a TV in addition to an external device according to another embodiment of the present disclosure.

FIG. 2 illustrates components inside a TV and an external device according to another embodiment of the present disclosure. Those skilled in the art may implement the present disclosure by combining some components with reference to FIGS. 1 and 2.

Although a TV 200 shown in FIG. 2 includes various components, the scope of the rights of the present disclosure is not limited thereto and should be determined according to the matters described in the claims.

Moreover, the components inside the TV 200 shown in FIG. 2 may be controlled through the controller 209, and each of the components may be directly or indirectly connected thereto. That is, although not shown in FIG. 2, all of the components inside the TV 200 of FIG. 2 are designed to directly or indirectly transmit and receive control signals and/or data.

First, a tuner 201 receives a broadcast signal through an antenna or the like, and a demuxer (demux or demultiplexer) 202 demultiplexes audio data and video data included in the broadcast signal.

An audio decoder 203 decodes the audio data (in encoded state) included in the broadcast signal, and a video decoder 204 decodes the video data (in encoded state) included in the broadcast signal.

The decoded audio data is outputted through an audio output unit 207. The audio output unit 207 may be, for example, a speaker attached to or spaced apart from the TV 200.

Meanwhile, the decoded video data is directly outputted through a video output unit 208. Alternatively, a mixer 205 mixes menu data generated by an OSD generating unit 206 and the video data and then transmits the mixed menu data to the video output unit 208.

A memory 215 stores various control data and commands for controlling the TV 200, and the controller 209 may control all components in the TV with reference to the memory 215.

Furthermore, the TV 200 transmits and receives data through communication with various peripheral external devices. For example, video and audio data are received from an STB 220 via a wired interface 212, and then processed by the audio decoder 203 and the video decoder 204, respectively. Alternatively, the received video and audio data may be directly outputted through the audio output unit 207 and the video output unit 208 without passing through the decoders 203 and 204.

Various data is transmitted and received with a mobile device 230 (e.g., a mobile phone, a wearable device, etc.) via a wireless communication module 213, and an infrared (IR) signal of a remote controller 240 is received through an IR sensor 214. Alternatively, the remote controller 240 capable of Bluetooth communication such as BT transmits and receives various data to and from the TV via the wireless communication module 213.

Figure 3:
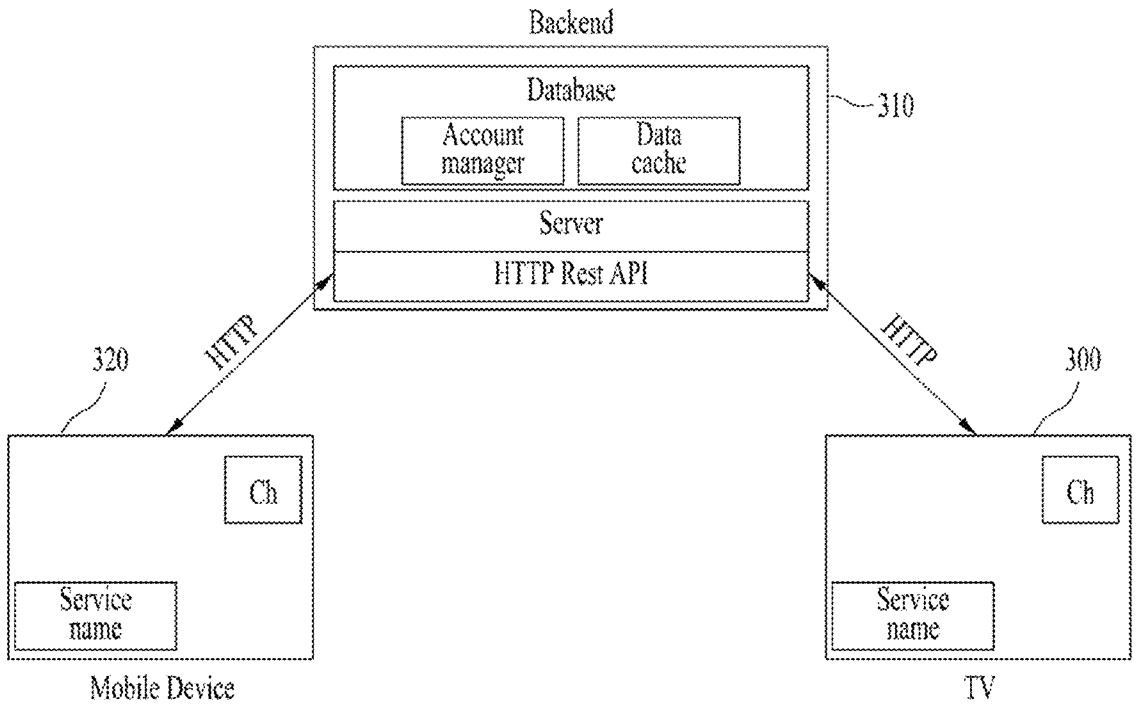
FIG. 3 illustrates an overall system including a TV, a mobile device, and a server according to an embodiment of the present disclosure.

FIG. 3 illustrates an overall system including a TV, a mobile device, and a server according to an embodiment of the present disclosure.

According to an embodiment of the present disclosure, the following situations may all be covered.

First, a live channel watched on a TV 300 may be watched on a mobile device 320 by connecting it to a live channel provided by an over the top (OTT) of the mobile device 320. An OTT service refers to, for example, a service of providing various media contents such as broadcast programs, movies, and education through the Internet. When connected to an IP network, not only the TV 300 but also the mobile device 320 may provide the OTT service.

Secondly, a live channel watched on the TV 300 may be watched through the same VoD content provided by the OTT of the mobile device 320.

Thirdly, a live channel provided by the OTT of the mobile device 320 may be watched on the TV 300 by connecting it to a live channel of the TV 300.

Fourthly, a live channel provided by the OTT of the mobile device 320 may be watched as VoD content through an OTT application installed on the TV 300.

To implement them, the TV 300 and the mobile device 320 are designed to perform, for example, HTTP communication with a server 310.

More specifically, a representational state transfer (REST) API may be used. The REST API refers to an API created based on REST.

REST refers to specifying resources through an HTTP uniform resource identifier (URI) and applying CRUD operations to the resources (URI) through HTTP methods, POST, GET, PUT, and DELETE.

CRUD is a term that collectively refers to the basic data processing functions of computer software, such as Create, Read, Update, and Delete. The CRUD operations in REST are as follows.

Create: Create data (POST)
Read: Retrieve data (GET)
Update: Modify data (PUT)
Delete: Delete data (DELETE)

The advantages of REST are as follows.

First, since HTTP infrastructure is used as it is, there is no need to build separate infrastructure for using the REST API.

Secondly, the roles of a server and a client may be clearly separated.

Thirdly, since a REST API message clearly indicates what it intends, it is easy to understand what it intends.

Further, unlike the conventional technology, the server 310 is designed to cache a specific live broadcast program in a data cache, when it has been watched for a predetermined time on the TV 300 and the mobile device 320. To implement a continue view function (TV-mobile device, or mobile device-TV), the server is designed to additionally operate an account manager.

With reference to FIGS. 4 to 7, an embodiment in which content consumed on a mobile device may be continuously viewed on a TV will be described below.

Figure 4:
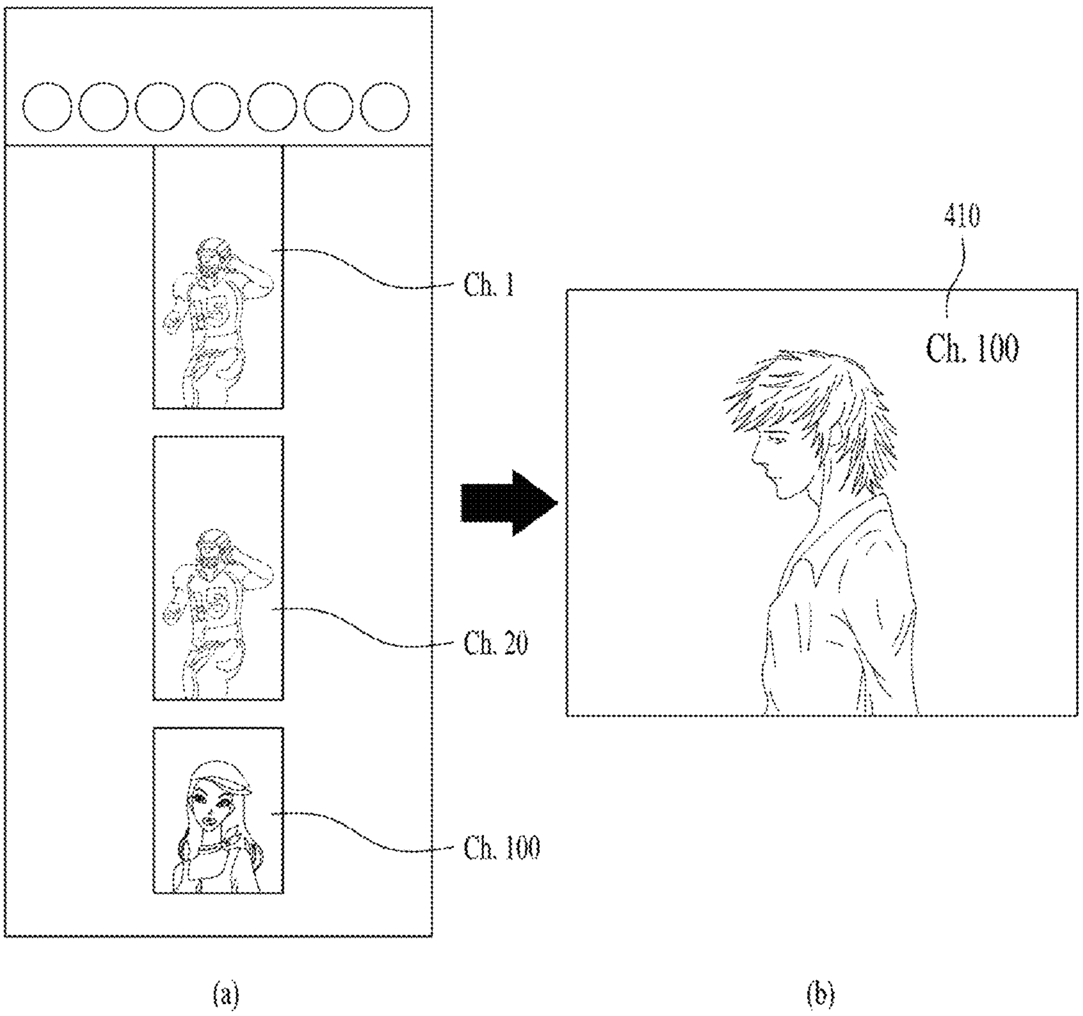
FIG. 4 illustrates a process of selecting an OTT service on a mobile device.

FIG. 4 illustrates a process of selecting an OTT service on a mobile device.

As illustrated in (a) of FIG. 4, it is assumed that a mobile device according to an embodiment of the present disclosure executes an OTT application stored in a memory.

The executed OTT application provides channels Ch. 1, Ch. 20, Ch. 100, and so on of programs currently broadcast in real time.

When a user selects a specific channel (Ch. 100 illustrated in (a) of FIG. 4), the mobile device according to an embodiment of the present disclosure displays a live broadcast program of the selected channel 410, as illustrated in (b) of FIG. 4.

Although FIG. 4 is based on the assumption that a live broadcast program is selected through the OTT application of the mobile device, the present disclosure is also applicable to a case where any video on demand VOD) content is selected.

Further, as described before with reference to FIG. 3, the TV and the mobile device according to an embodiment of the present disclosure are assumed to perform wireless communication, for example, HTTP communication, with the server.

Therefore, information about the live broadcast program selected through the mobile device in FIG. 4 is transmitted to the server. To implement a continue view function of the TV, account information about the mobile device is also transmitted to the server.

Figure 5:
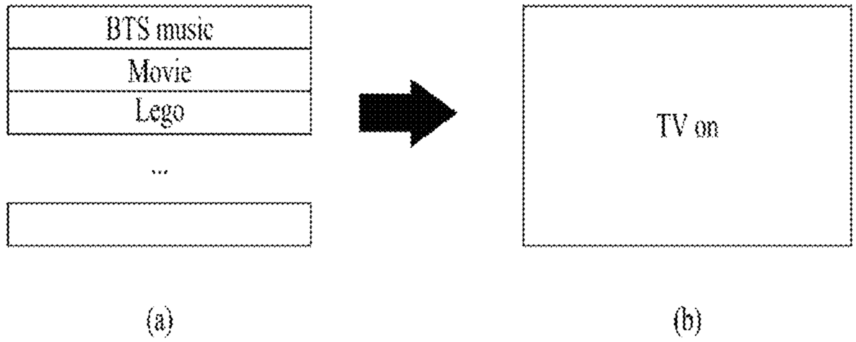
FIG. 5 illustrates a process of transmitting OTT service-related data of a mobile device cached in a server to a TV, based on FIG. 4.

FIG. 5 illustrates a process of transmitting data related to an OTT service of a mobile device stored in a server to a TV, based on FIG. 4.

As illustrated in (a) of FIG. 5, the server according to an embodiment of the present disclosure stores information about the live broadcast program watched currently through the OTT application of the mobile device in a database (DB). Although not illustrated in (a) of FIG. 5, the information about the live broadcast program is mapped to the account information about the mobile device that has transmitted it, and stored in the DB of the server.

Further, as illustrated in (b) of FIG. 5, when a TV with the same account information as the mobile device is turned on, the information about the current live broadcast program of the mobile device stored in the server is transmitted from the server to the TV. In FIG. 5, it is assumed that when the TV is turned on, the information about the current live broadcast program of the mobile device is transmitted. However, it is also within the scope of the present disclosure to design the information about the current live broadcast program of the mobile device to be transmitted, only when a request is made through a remote control of the TV.

Figure 6:
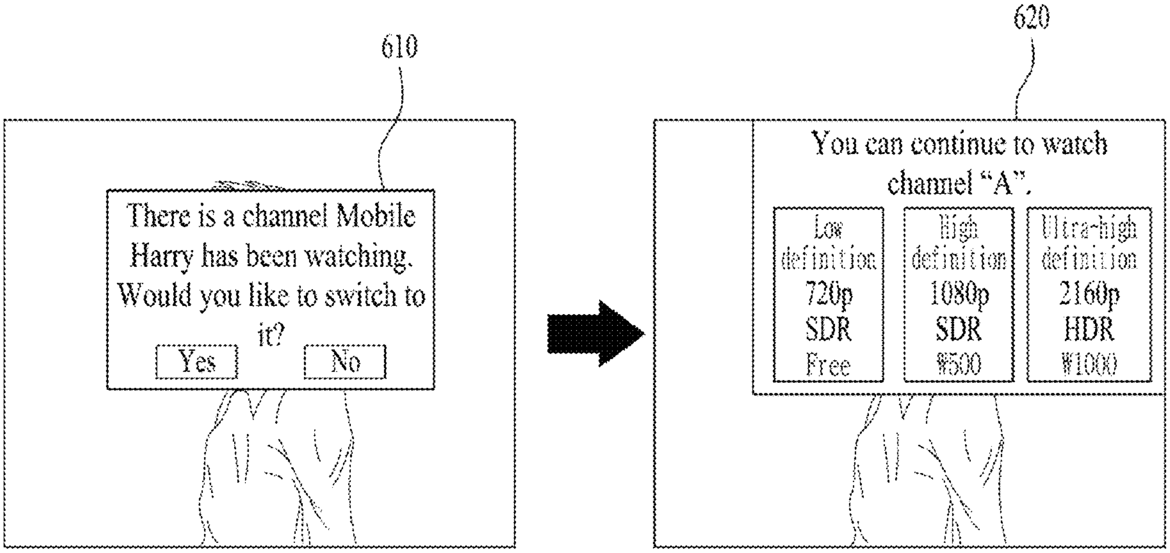
FIG. 6 illustrates a process of displaying OTT service-related information of a mobile device on a TV, based on FIG. 5.

FIG. 6 illustrates a process of displaying information related to an OTT service of a mobile device on a TV, based on FIG. 5.

Although not illustrated in FIG. 6, unlike a mobile device, a TV is generally shared and used by a plurality of users. Therefore, when person B turns on the TV, while person A is watching Ch. 11 on a portable phone, it is not desirable to continuously display Ch. 11 on the TV.

To solve this problem, options for identifying family members are preferably displayed after the TV is turned on. When an option for identifying a family member is selected through the TV, the TV transmits related information to the server. Therefore, there is a technical effect of providing a continue view service suitable for a user who has currently turned on the TV by the server.

In (a) of FIG. 6, it is assumed that a person named Harry has selected an option for identifying himself after turning on the TV. Upon receipt of information identifying Harry from the TV, the server extracts information about a channel executed currently or immediately before on a mobile device with the same account from the DB, and transmits the extracted channel information back to the TV.

Therefore, as illustrated in (a) of FIG. 6, the TV according to an embodiment of the present disclosure may display a message 610 asking whether to switch to the channel watched on the mobile device.

When "Yes" is selected in the message 610 illustrated in (a) of FIG. 6, the TV according to an embodiment of the present disclosure sequentially displays a next message 620 for selecting an image definition or price of the channel, as illustrated in (b) of FIG. 6.

Although the foregoing embodiments of the present disclosure have been described with a focus on screens provided by the mobile device and the TV with reference to FIGS. 4 to 6, a specific communication protocol with the server will be described below with reference to FIG. 7.

Figure 7:
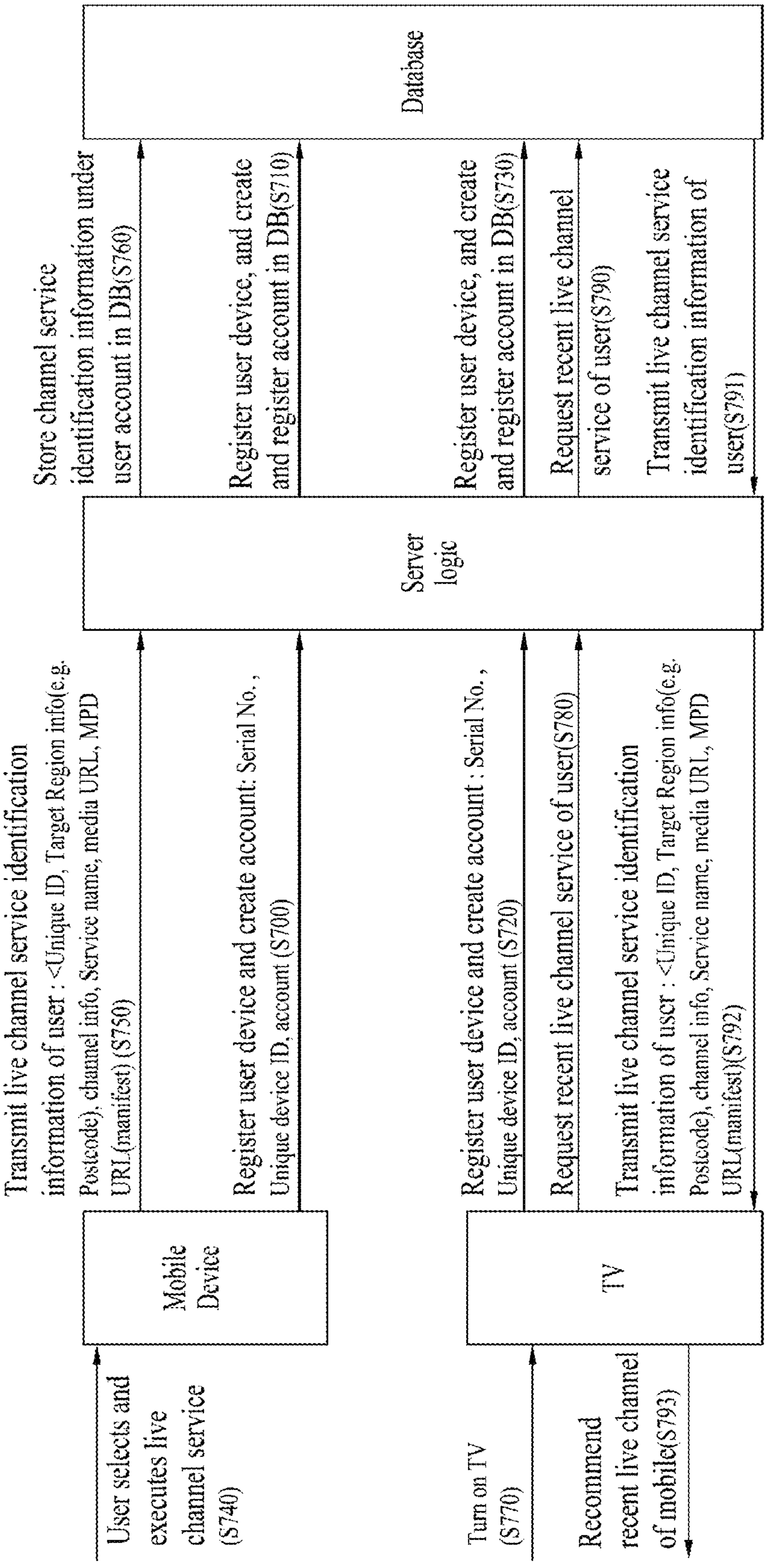
FIG. 7 is a flowchart illustrating the processes illustrated in FIGS. 4 to 6 in a time series manner.

FIG. 7 is a flowchart illustrating the processes illustrated in FIGS. 4 to 6 in a time series manner.

For reference, interfaces illustrated in FIG. 7 are configured as, for example, REST APIs. In addition, data is transmitted through HTTP, and methods such as PUT, GET, and POST may be defined depending on the type of transmitted information or a request.

For example, the GET method is mainly used when data is read or retrieved. When a GET request is successfully completed, a 200 (OK) HTTP response code is returned along with XML or JSON. When an error occurs, a 404 (Not found) error or a 400 (Bad request) error mainly occurs.

For example, the POST method is mainly used when a new resource is created. More specifically, POST is used to create sub-resources (sub-resources of parent resources). When the creation is successfully completed, a 201 (Created) HTTP response is returned.

For example, the PUT method is used to transmit data to the server to create/update resources.

Referring again to FIG. 7, the mobile device according to an embodiment of the present disclosure transmits account information to the server (S700). The account information includes, for example, a serial number, a unique device ID, a user ID/PW, and so on of the mobile device. The server registers the account information received in step S700 in the DB (S710).

The TV according to an embodiment of the present disclosure also transmits account information to the server (S720). The account information includes, for example, a serial number, a unique device ID, a user ID/PW, and so on of the TV. The server registers the account information received in step S720 in the DB (S730).

Although not shown in FIG. 7, the server is designed to enable the continue view function by managing the account information about the TV and the mobile device together, when they are the same (e.g., the IDs/PWs are the same).

For example, it is assumed that a live broadcast program is being watched through an OTT service on the mobile device (S740). The mobile device transmits identification information related to the live broadcast program to the server (S750). In another embodiment, it is also within the scope of the present disclosure to design step S750 to be performed only when the live broadcast program received through an IP network is displayed on the mobile device for a predetermined time (e.g., 30 seconds or 1 minute). With this design, it is possible to solve the problem that unnecessary data is excessively accumulated on the server, thereby reducing a memory space.

The server maps the account information registered in the DB in step S710 to the channel service identification information received in step S750 and stores them in the DB (S760).

It is assumed that the TV according to an embodiment of the present disclosure is turned on (S770). The TV requests the live channel service watched on the other device from the server, automatically or upon request of the user (S780).

The server requests the live channel service used on the other device with the same account from the DB, based on the account information registered in step S730 (S790).

The DB transmits the identification information about the live channel service used on the other device with the same account to the server (S791).

The server is designed to transmit the identification information about the live channel service to the TV (S792), and the TV is designed to output a message recommending the recent channel used on the other device (e.g., the mobile device) on a screen (S793).

With reference to FIGS. 4 to 7, an embodiment of enabling a service, such as continuous viewing of content consumed on a mobile device, on a TV has been described in detail.

In contrast, an embodiment of enabling a service, such as continuous viewing of content consumed on a TV, on a mobile device will be described below with reference to FIGS. 8 to 10.

Figure 8:
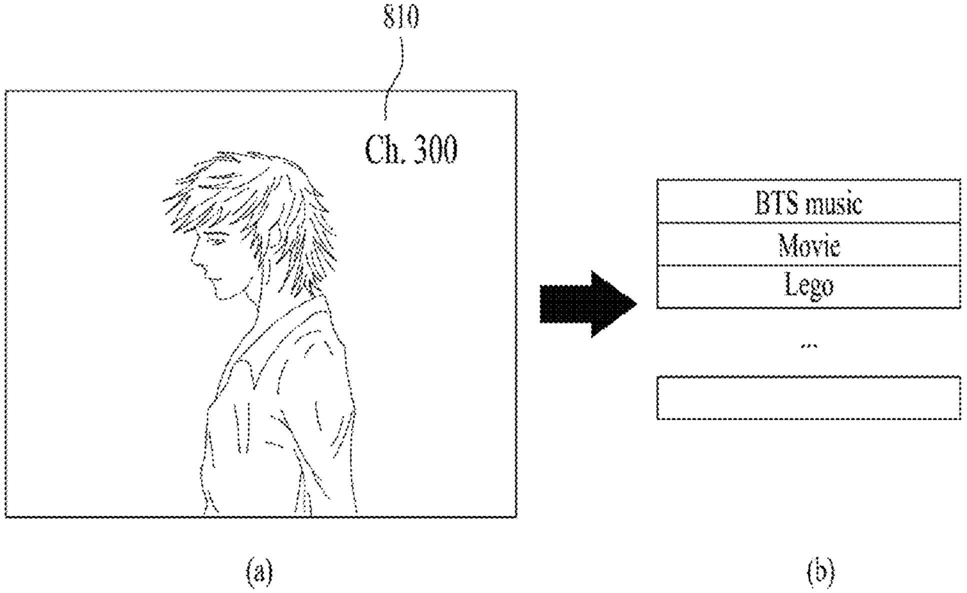
FIG. 8 illustrates a process of selecting a live channel and communicating with a server by a TV.

FIG. 8 illustrates a process of selecting a live channel and communicating with a server by a TV.

As illustrated in (a) of FIG. 8, it is assumed that the TV according to an embodiment of the present disclosure receives any live broadcast program (Ch. 300 810) through an IP network and then displays it.

The TV according to an embodiment of the present disclosure stores information about the currently output broadcast program to the server through the IP network.

Therefore, the server stores the information about the broadcast program together with account information transmitted by the TV, as illustrated in (b) of FIG. 8. The account information will be described later in detail with reference to FIG. 10 (particularly, S1000).

Figure 9:
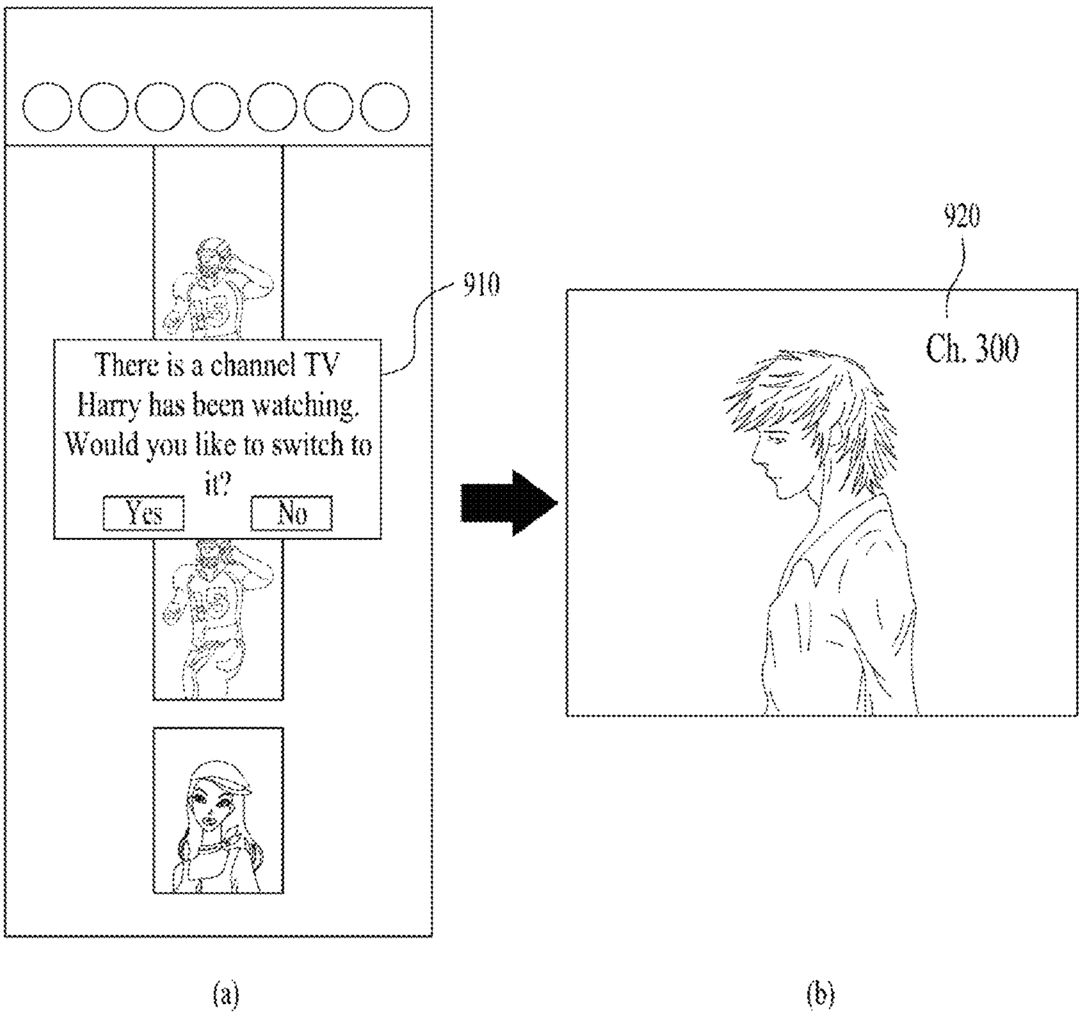
FIG. 9 illustrates a process of displaying OTT service-related information on a mobile device, based on FIG. 8.

FIG. 9 illustrates a process of displaying information related to an OTT service on a mobile device, based on FIG. 8.

First, it is assumed that the mobile device illustrated in (a) of FIG. 9 may also access the server illustrated in (b) of FIG. 8 through the IP network, and transmit and receive data.

Therefore, the mobile device according to an embodiment of the present disclosure is capable of displaying a guide message 910 that enables switching to a channel watched on the TV, based on information received from the DB of the server (see (b) of FIG. 8).

When "Yes" is selected in the guide message 910 illustrated in (a) of FIG. 9, the mobile device also switches to the same channel 920 as that of the TV and displays the corresponding broadcast program, as illustrated in (b) of FIG. 9.

The operations of the TV, the mobile device, and the server have been described separately with reference to FIGS. 8 and 9. Now, a description will be given of an overall process of transmitting and receiving data by each entity in the overall system with reference to FIG. 10.

Figure 10:
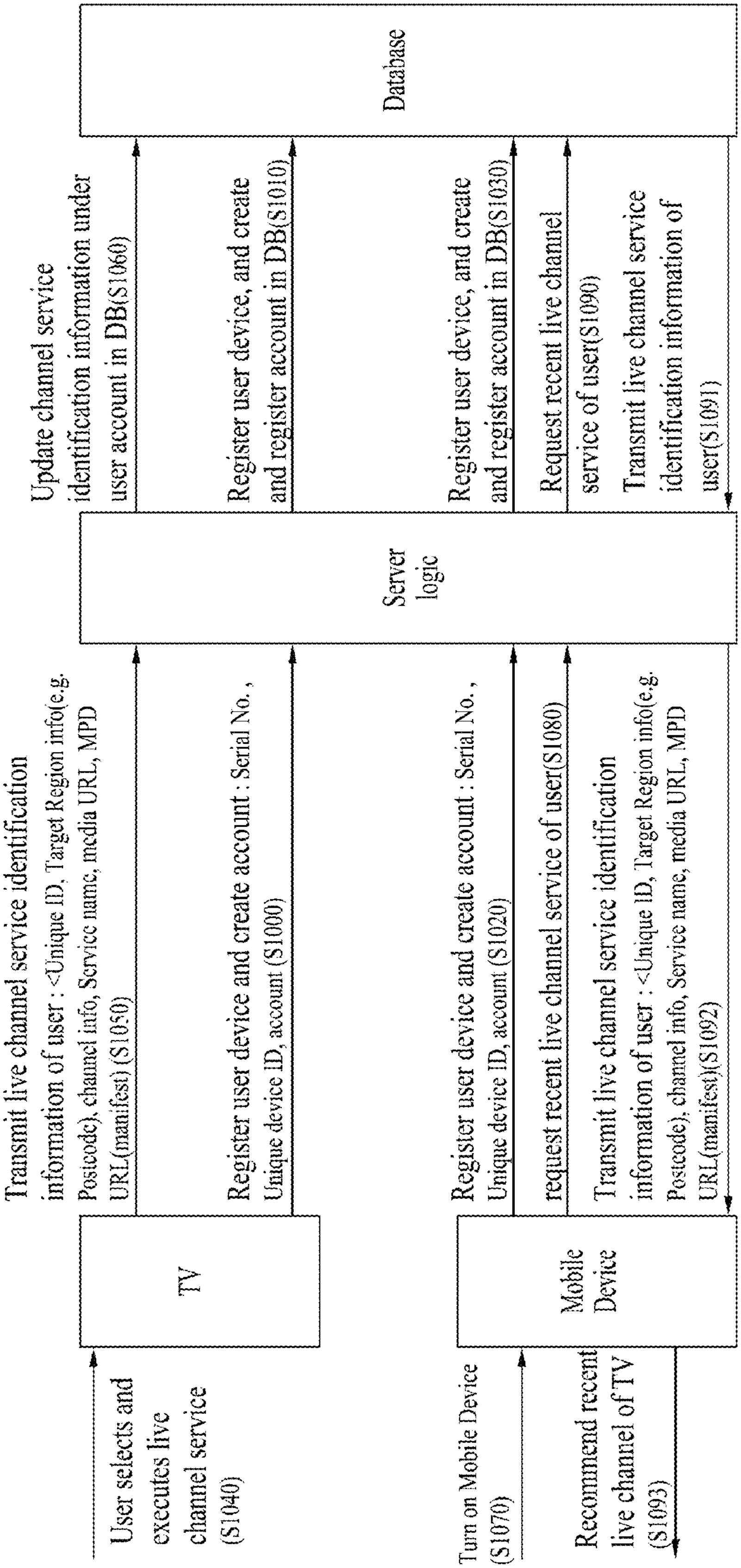
FIG. 10 is a flowchart illustrating the processes illustrated in FIGS. 8 and 9 in a time series manner.

FIG. 10 is a flowchart illustrating the processes of FIGS. 8 and 9 in a time series manner.

As described before with reference to FIG. 7, interfaces illustrated in FIG. 10 are also configured as, for example, REST APIs. Data is transmitted through HTTP, and methods such as PUT, GET, and POST may be defined depending on the type of transmitted information or a request.

Referring again to FIG. 10, the TV according to an embodiment of the present disclosure transmits account information to the server (S1000). The account information includes, for example, a serial number, a unique device ID, a user ID/PW, and so on of the TV. The server registers the account information received in step S1000 in the DB (S1010).

The mobile device according to an embodiment of the present disclosure also transmits account information to the server (S1020). The account information includes, for example, a serial number, a unique device ID, a user ID/PW, and so on of the mobile device. The server registers the account information received in step S1020 in the DB (S1030).

Although not shown in FIG. 10, the server is designed to enable the continue view function by managing the account information about the TV and the mobile device together, when they are the same (e.g., the IDs/PWs are the same).

For example, it is assumed that a live broadcast program is being watched through an OTT service on the TV (S1040). The TV transmits identification information related to the live broadcast program to the server (S1050).

The server maps the account information registered in the DB in step S1010 to the channel service identification information received in step S1050 and stores them in the DB (S1060).

It is assumed that the mobile device according to an embodiment of the present disclosure is turned on (S1070). The mobile device requests the live channel service watched on the other device from the server (S1080).

Based on the account information registered in step S1030, the server requests the live channel service used on the other device with the same account from the DB (S1090).

The DB transmits the identification information about the live channel service used on the other device with the same account to the server (S1091).

The server is designed to transmit the identification information about the live channel service to the mobile device (S1092), and the mobile device is designed to output a message recommending the recent channel used on the other device (e.g., the TV) on a screen (S1093).

The foregoing embodiments relate to a technique of, when a broadcast program of a specific channel is provided on a first device, providing the broadcast program of the same specific channel on a second device through communication with a server. However, when the broadcast program displayed on the first device ends at a time when the second device accesses the specific channel, a problem that the needs of the user are not satisfied may occur.

To solve this problem, a solution of displaying a different guide message on the second device according to the result of a comparison between a current time and the end time of the live broadcast program will be described below with reference to FIGS. 11 to 14.

Figure 11:
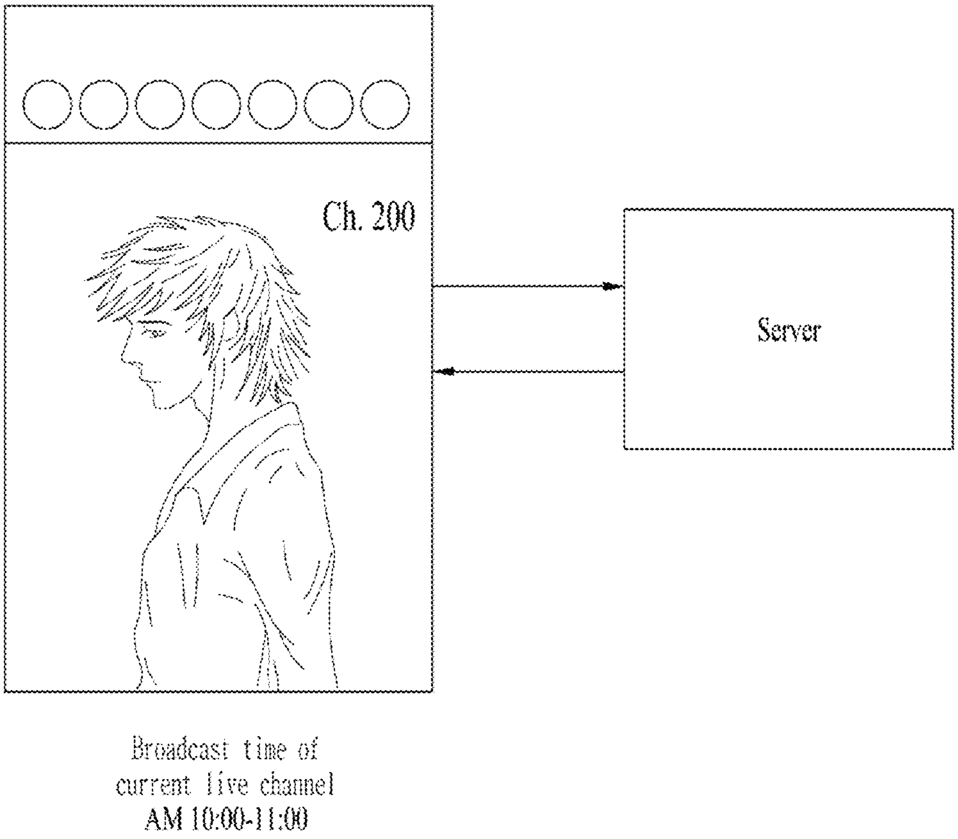
FIG. 11 illustrates a process of selecting a live channel and communicating with a server by a mobile device.

FIG. 11 illustrates a process of selecting a live channel and communicating with a server by a mobile device.

As illustrated in FIG. 11, it is assumed that the mobile device according to an embodiment of the present disclosure accesses Ch. 200 through an OTT service. The broadcast time of the current live channel is set to 10:00 to 11:00 AM, which may be recognized by the mobile device through other metadata such as EPG information.

Further, the mobile device transmits information about the current channel, information about the start/end time of a current broadcast program, account information, and so on to the server.

Figure 12:
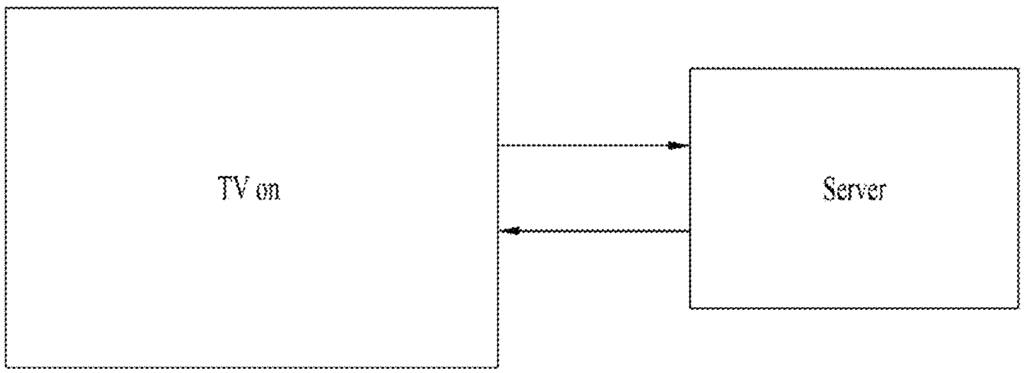

FIG. 12 illustrates a process of communicating with a server, while a TV is turned on. FIG. 12 is based on the situation described above with reference to FIG. 11. In other words, the server illustrated in FIG. 11 is identical to the server illustrated in FIG. 12.

Therefore, when the TV according to an embodiment of the present disclosure is powered on, it receives information about a current channel, information about the start/end time of a current broadcast program, and so on of a mobile device managed with the same account information by the server.

Figure 13:
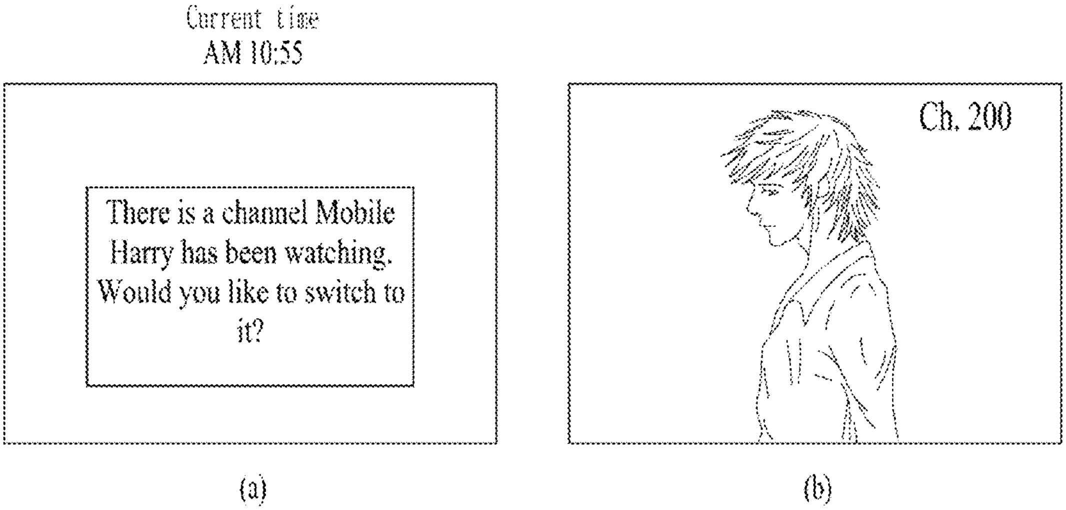
FIG. 13 illustrates a process of providing a live broadcast program based on current time information or the like by a TV according to an embodiment of the present disclosure.

FIG. 13 illustrates a process of providing a live broadcast program based on current time information by a TV according to an embodiment of the present disclosure. FIG. 13 is based on the situation described above with reference to FIG. 12.

As illustrated in (a) of FIG. 13, it is assumed that a current time is 10:55 AM, and the end time of a broadcast program watched on the mobile device is 11:00 AM.

Therefore, upon recognizing that the current time (10:55 AM) is earlier than the end time (11:00 AM) of the broadcast program, the TV displays a message asking whether to switch to the same channel, as illustrated in (a) of FIG. 13.

As illustrated in (b) of FIG. 13, the TV may also access the same channel and display the same broadcast program output from the mobile device.

Figure 14:
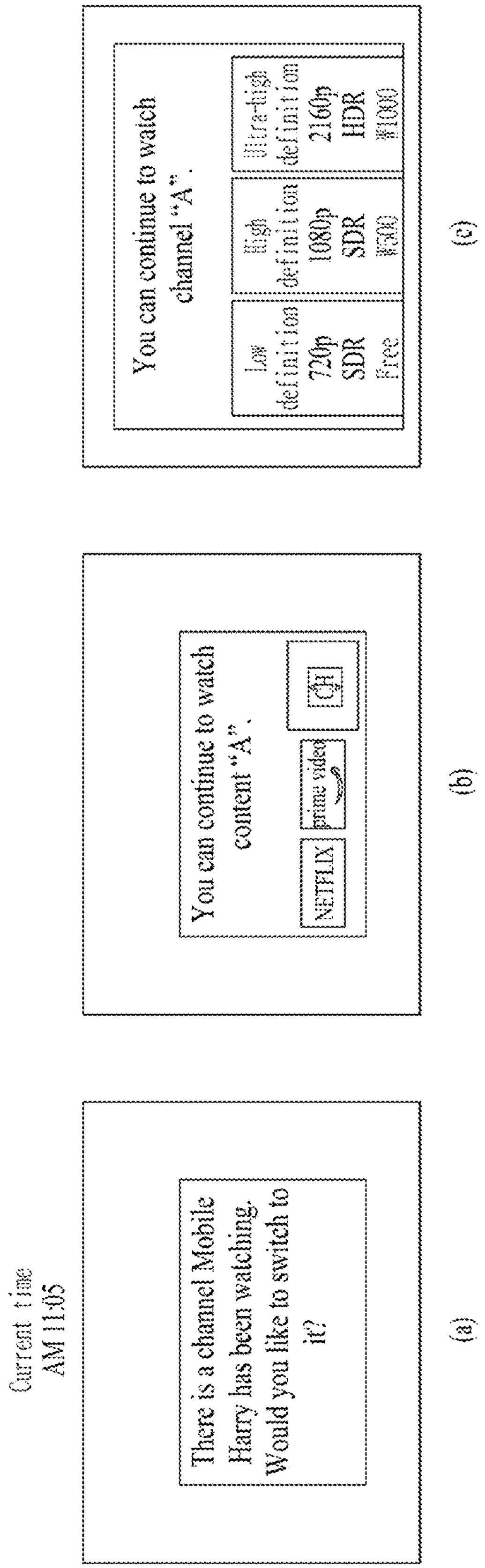
FIG. 14 illustrates a process of providing content based on current time information or the like by a TV according to an embodiment of the present disclosure.

FIG. 14 illustrates a process of providing content based on current time information by a TV according to an embodiment of the present disclosure. FIG. 14 is based on the situation described above with reference FIG. 12, and is not related to the situation of FIG. 13.

As illustrated in (a) of FIG. 14, it is assumed that a current time is 11:05 AM, and the end time of a broadcast program watched on the mobile device is 11:00 AM.

Therefore, upon recognizing that the current time (11:05 AM) is earlier than the end time (11:00 AM) of the broadcast program, the TV displays a message asking whether to access content rather than switching the channel, as illustrated in (a) of FIG. 14. This is an embodiment clearly distinct from that illustrated in (a) of FIG. 13.

While the embodiment of FIG. 13 relates to simple channel switching, and thus has a 2-level depth, whereas the embodiment of FIG. 14 does not relate to simple channel switching, and thus has, for example, a depth of 3 or more levels.

For example, the TV according to an embodiment of the present disclosure displays a first option for selecting a specific content provider (CP) from among at least one CP providing the same content, using title information about a broadcast program received from the server, although a current live channel has ended, as illustrated in (a) of FIG. 14.

The TV according to an embodiment of the present disclosure is designed to display a second option for selecting an image definition (e.g., 720p, 1080p, or 2160p) or price (e.g., free, ₩500, or ₩1000) of the content, as illustrated in (c) of FIG. 14.

From the perspective of the overall system (a first device, a second device, and a server), the foregoing embodiments will be summarized as follows. When the first device corresponds to a TV, the second device corresponds to a mobile device. On the contrary, when the first device corresponds to a mobile device, the second device corresponds to a TV.

Account information identifying at least one user using the first device is transmitted to the server by the first device. The first device displays a live broadcast program received through an IP network.

The first device transmits identification information about the live broadcast program to the server. The identification information about the live broadcast program includes, for example, at least one of a unique ID, channel information, a service name, a media universal resource locator (URL), or a media presentation description (MPD) URL.

The server is designed to store the account information and the identification information by mapping them.

The second device transmits account information identical to the account information to the server. The second device selectively displays the live broadcast program (see FIG. 13) or content corresponding to the live broadcast program (see FIG. 14) according to a current time and the end time of the live broadcast program.

More specifically, when the current time is earlier than the end time of the live broadcast program, the second device is designed to display the live broadcast program (see FIG. 13). To implement this, the identification information about the live broadcast program is transmitted to the second device by the server.

On the contrary, when the end time of the live broadcast program is earlier than the current time, the second device is designed to display the content corresponding to the live broadcast program. Obviously, before displaying the content (e.g., VOD), the second device displays a first option ((b) of FIG. 14) for selecting a specific CP from among at least one CP providing the content, and displays a second option ((c) of FIG. 14) for selecting an image definition or price of the content.

From the perspective of the TV (see FIG. 2), the foregoing embodiments are summarized as follows.

According to an embodiment of the present disclosure, the TV 200 controlled by the remote control 240 includes an IR receiver (the IR sensor 214 illustrated in FIG. 2) that receives a power-on signal from the remote control 240, a transceiver (the wireless communication module 213 illustrated in FIG. 2) that performs wireless communication with a server, a display (the video output unit 208 illustrated in FIG. 2) that outputs any video data, and a controller (the controller 209 illustrated in FIG. 2) that controls the IR receiver, the transceiver, and the display.

Particularly, the controller controls the display to selectively display a specific broadcast program (see FIG. 13) or content corresponding to the specific broadcast program (see FIG. 14) according to data received from the server and a current time.

The data received from the server includes, for example, information about a live broadcast program being output through a mobile device using the same account information as the TV 200.

The above-described specific broadcast program is designed to be received through an IP network, unlike the conventional technology.

As described above with reference to FIG. 13, when the current time is earlier than the end time of the live broadcast program, the controller 209 controls the transceiver (e.g., the wireless communication module 213 illustrated in FIG. 2) to output the live broadcast program.

As described above with reference to FIG. 14, when the end time of the live broadcast program is earlier than the current time, the controller 209 controls the transceiver (e.g., the wireless communication module 213 illustrated in FIG. 2) to output content corresponding to the live broadcast program.

This design advantageously enables a linked channel service between a TV (e.g., conforming to the DVB-I standard) and a mobile device.

As described above, there has been no technique of attempting linkage between a channel service of a TV and an OTT service of a mobile device up to now, and there have been limitations in independent provisioning and operation between a TV manufacturer and an OTT of a service provider.

According to the conventional technology, only screen sharing or mirroring is available through the same network or short-range communication (wifi direct). In contrast, the embodiments of the present disclosure are different from the conventional technology in that a mobile device and a TV link a live channel and content through a communication network (e.g., 3G to 6G).

A conventional OTT service is a technology of simply recommending content, without any relation to linkage to a live channel.

Further, according to an embodiment of the present disclosure, it is designed that a server side registers and maps each device through unique information (e.g., account information) about a TV/mobile device, unique information about a channel/content consumed by each device is transmitted to the server, and another device receives the information from the server.

Accordingly, there is a technical effect that channel/content-related information accumulated in a DB of a server may be managed as big data, and thus used as linkage information and high value-added data available for personalized services or targeted advertising.

The present disclosure described above may be implemented as a computer-readable code on a medium in which a program is recorded. Computer-readable media includes any type of recording device that stores data to be read by a computer system. Examples of computer-readable media include hard disk drives (HDDs), solid state disks (SSDs), silicon disk drives (SDDs), ROMs, RAMs, CD-ROMs, magnetic tapes, floppy disks, optical data storage devices, and also those implemented in the form of carrier waves (e.g., transmitted over the Internet). The computer may include a controller. Accordingly, the detailed description should not be construed as restrictive in all respects but should be considered illustrative. The scope of the present disclosure should be determined by a reasonable interpretation of the appended claims, and all changes within the equivalent scope of the present disclosure are intended to be included within the scope of the present disclosure.

Mode for Invention

Various embodiments of the present disclosure have been described in "Best Mode" which is the previous content, and it should be appreciated to combine the embodiments described in two or more figures by those skilled in the art as needed belongs to the scope of the present disclosure.

Industrial Applicability

The present disclosure is applicable to any type of multimedia device (e.g., TV, portable phone, tablet PC, laptop, or wearable device), and thus its industrial applicability is acknowledged.

The invention claimed is:

1. A control method of a system, comprising:

transmitting account information identifying at least one user using a first device to a server by the first device;

displaying a live broadcast program received through an Internet protocol (IP) network by the first device;

transmitting identification information about the live broadcast program to the server by the first device;

mapping and storing the account information and the identification information by the server;

transmitting account information identical to the account information to the server by a second device; and selectively displaying the live broadcast program or content corresponding to the live broadcast program by the second device according to a current time and an end time of the live broadcast program, wherein:

when the current time is earlier than the end time of the live broadcast program, the second device displays the live broadcast program, and when the end time of the live broadcast program is earlier than the current time, the second device displays the content corresponding to the live broadcast program.

2. The control method of claim 1, further comprising transmitting the identification information about the live broadcast program to the second device by the server.

3. The control method of claim 2, further comprising, before the content corresponding to the live broadcast program is displayed:

displaying a first option for selecting a specific content provider (CP) from among at least one CP providing the content by the second device; and displaying a second option for selecting an image definition or a price of the content by the second device.

4. The control method of claim 1, wherein the identification information about the live broadcast program includes at least one of a unique ID, channel information, a service name, a media universal resource locator (URL), or a media presentation description (MPD) URL.

5. The control method of claim 1, wherein only when the live broadcast program received through the IP network is displayed by the first device for a predetermined time or longer, transmitting the identification information about the live broadcast program to the server by the first device is performed.

6. The control method of claim 1, wherein when the first device corresponds to a television (TV), the second device corresponds to a mobile device.

7. The control method of claim 1, wherein when the first device corresponds to a mobile device, the second device corresponds to a TV.

8. The control method of claim 6, wherein a digital video broadcasting-Internet (DVB-I) standard is applied to the TV.

9. A television (TV) controlled by a remote control, comprising:

an infrared (IR) receiver receiving a power-on signal from the remote control;

a transceiver performing wireless communication with a server;

a display outputting any video data; and a controller controlling the IR receiver, the transceiver, and the display, wherein the controller controls the display to selectively display a live broadcast program or content corresponding to the live broadcast program according to data received from the server and a current time, wherein the data received from the server includes information about a live broadcast program being output through a mobile device using the same account information as the TV, wherein when the current time is earlier than an end time of the live broadcast program, the controller controls the transceiver to output the live broadcast program, and wherein when the end time of the live broadcast program is earlier than the current time, the controller controls the transceiver to output the content corresponding to the live broadcast program.

10. The TV of claim 9, wherein the live broadcast program is received through an IP network.

11. The TV of claim 9, wherein before the content corresponding to to the live broadcast program is displayed, the controller controls the display to display a first option for selecting a specific content provider (CP) from among at least one CP providing the content, and controls the display to display a second option for selecting an image definition or a price of the content.

12. The control method of claim 7, wherein a digital video broadcasting-Internet (DVB-I) standard is applied to the TV.

* * * * *